(12) United States Patent
Okamoto et al.

(10) Patent No.: US 12,113,404 B2
(45) Date of Patent: Oct. 8, 2024

(54) MOTOR UNIT

(71) Applicant: Nidec Corporation, Kyoto (JP)

(72) Inventors: Toshiya Okamoto, Kyoto (JP);
Yoshiaki Yamashita, Kyoto (JP);
Takashi Hattori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 284 days.

(21) Appl. No.: 17/761,618

(22) PCT Filed: Sep. 1, 2020

(86) PCT No.: PCT/JP2020/033151
§ 371 (c)(1),
(2) Date: Mar. 18, 2022

(87) PCT Pub. No.: WO2021/065299
PCT Pub. Date: Apr. 8, 2021

(65) Prior Publication Data
US 2022/0393556 A1    Dec. 8, 2022

(30) Foreign Application Priority Data

Sep. 30, 2019  (JP) .................................. 2019-179705

(51) Int. Cl.
*H02K 11/33* (2016.01)
*H02K 5/22* (2006.01)

(52) U.S. Cl.
CPC ............. *H02K 11/33* (2016.01); *H02K 5/225* (2013.01)

(58) Field of Classification Search
CPC ............................... H02K 11/33; H02K 5/225
See application file for complete search history.

(56) References Cited

U.S. PATENT DOCUMENTS 6,198,183 B1 * 3/2001 Baeumel ............... H02K 5/225
310/52
7,224,092 B2   5/2007 Masuda et al.
(Continued)

FOREIGN PATENT DOCUMENTS

CN    106505802 A    3/2017
CN    107615624 A    1/2018
(Continued)

OTHER PUBLICATIONS

Official Communication issued in corresponding Chinese Patent Application No. 202080067904.X, mailed on Dec. 28, 2023.
(Continued)

*Primary Examiner* — Forrest M Phillips
(74) *Attorney, Agent, or Firm* — Keating & Bennett, LLP

(57) ABSTRACT

A motor assembly includes a housing and a plate-shaped first substrate. The housing houses a motor whose axis of rotation extends in the axial direction. Electronic components are mounted on the first substrate. The housing includes a tubular portion and a side wall portion. The tubular portion extends in the axial direction and accommodates the motor. The side wall portion protrudes from a radial outer surface of the tubular portion in a direction including at least the radially outward direction and the circumferential direction, and extends in the axial direction. An accommodation space to accommodate the electronic components is provided between the tubular portion and the side wall portion as viewed from the axial direction.

7 Claims, 11 Drawing Sheets

(56) References Cited

U.S. PATENT DOCUMENTS

| | | | | |
|---|---|---|---|---|
| 8,604,655 | B1* | 12/2013 | Ferran | H02K 3/28 |
| | | | | 310/179 |
| 9,647,514 | B2 | 5/2017 | Katakami et al. | |
| 9,881,019 | B2* | 1/2018 | Matsuo | G06F 16/1748 |
| 10,008,895 | B2* | 6/2018 | Hattori | H02M 7/003 |
| 10,263,499 | B2 | 4/2019 | Yamashita | |
| 10,505,427 | B2* | 12/2019 | Shimizu | H02K 9/227 |
| 2013/0049495 | A1* | 2/2013 | Matsuo | G06F 16/1748 |
| | | | | 310/59 |
| 2013/0119793 | A1* | 5/2013 | Hofkirchner | H02K 5/203 |
| | | | | 310/54 |
| 2013/0257201 | A1* | 10/2013 | Lemke | H02K 5/225 |
| | | | | 310/71 |
| 2014/0050603 | A1* | 2/2014 | Hoj | H02K 11/40 |
| | | | | 417/410.1 |
| 2015/0002002 | A1* | 1/2015 | Monster | H05K 7/14322 |
| | | | | 310/68 R |
| 2018/0115224 | A1 | 4/2018 | Yamashita | |
| 2018/0159403 | A1 | 6/2018 | Yokoyama et al. | |
| 2019/0193775 | A1 | 6/2019 | Hamada | |
| 2022/0190692 | A1* | 6/2022 | Christian | H02K 5/225 |
| 2022/0368191 | A1* | 11/2022 | Misawa | H02K 5/225 |
| 2022/0393544 | A1* | 12/2022 | Fujii | H02K 1/2706 |

FOREIGN PATENT DOCUMENTS

| | | |
|---|---|---|
| JP | 51-108008 U | 8/1976 |
| JP | 2000-209810 A | 7/2000 |
| JP | 2011-031755 A | 2/2011 |
| JP | 2016-174501 A | 9/2016 |
| JP | 6414332 B2 | 10/2018 |
| JP | 2018-207640 A | 12/2018 |
| JP | 2019/064793 A1 | 4/2019 |
| KR | 10-2017-0093392 A | 8/2017 |
| WO | 2017/026128 A1 | 2/2017 |

OTHER PUBLICATIONS

Official Communication issued in International Patent Application No. PCT/JP2020/034771, mailed on Nov. 17, 2020.

Official Communication issued in International Patent Application No. PCT/JP2020/033151, mailed on Dec. 1, 2020.

Official Communication issued in International Patent Application No. PCT/JP2020/034776, mailed on Nov. 10, 2020.

Okamoto et al., "Motor Unit", U.S. Appl. No. 17/761,616, filed Mar. 18, 2022.

Okamoto et al., "Motor Unit", U.S. Appl. No. 17/761,619, filed Mar. 18, 2022.

* cited by examiner

MOTOR UNIT

CROSS-REFERENCE TO RELATED APPLICATIONS

This is a U.S. national stage of application No. PCT/JP2020/033151, filed on Sep. 1, 2020, with priority under 35 U.S.C. § 119(a) and 35 U.S.C. § 365(b) being claimed from Japanese Patent Application No. 2019-179705, filed on Sep. 30, 2019, the entire disclosures of which are hereby incorporated herein by reference.

1. FIELD OF THE INVENTION

The present disclosure relates to a motor assembly.

2. BACKGROUND

Conventionally, a motor assembly in which a large-sized electronic component such as a capacitor is mounted on a substrate for controlling a motor is known.

However, if a substrate on which a large-sized electronic component is mounted is arranged on a motor assembly, the electronic component may become bulky and the size of the outer shape of the motor assembly may increase.

SUMMARY

An example embodiment of a motor assembly of the present disclosure includes a housing and a plate-shaped first substrate. The housing houses a motor with an axis of rotation extending in an axial direction. Electronic components are mounted on the first substrate. The housing includes a tubular portion and a side wall portion. The tubular portion extends in the axial direction and accommodates the motor. The side wall portion protrudes from a radial outer surface of the tubular portion in a direction including at least a radially outward direction and a circumferential direction, and extends in the axial direction. An accommodation space to accommodate the electronic components is provided between the tubular portion and the side wall portion as viewed from the axial direction.

The above and other elements, features, steps, characteristics and advantages of the present disclosure will become more apparent from the following detailed description of the example embodiments with reference to the attached drawings.

DETAILED DESCRIPTION

Figure 1:
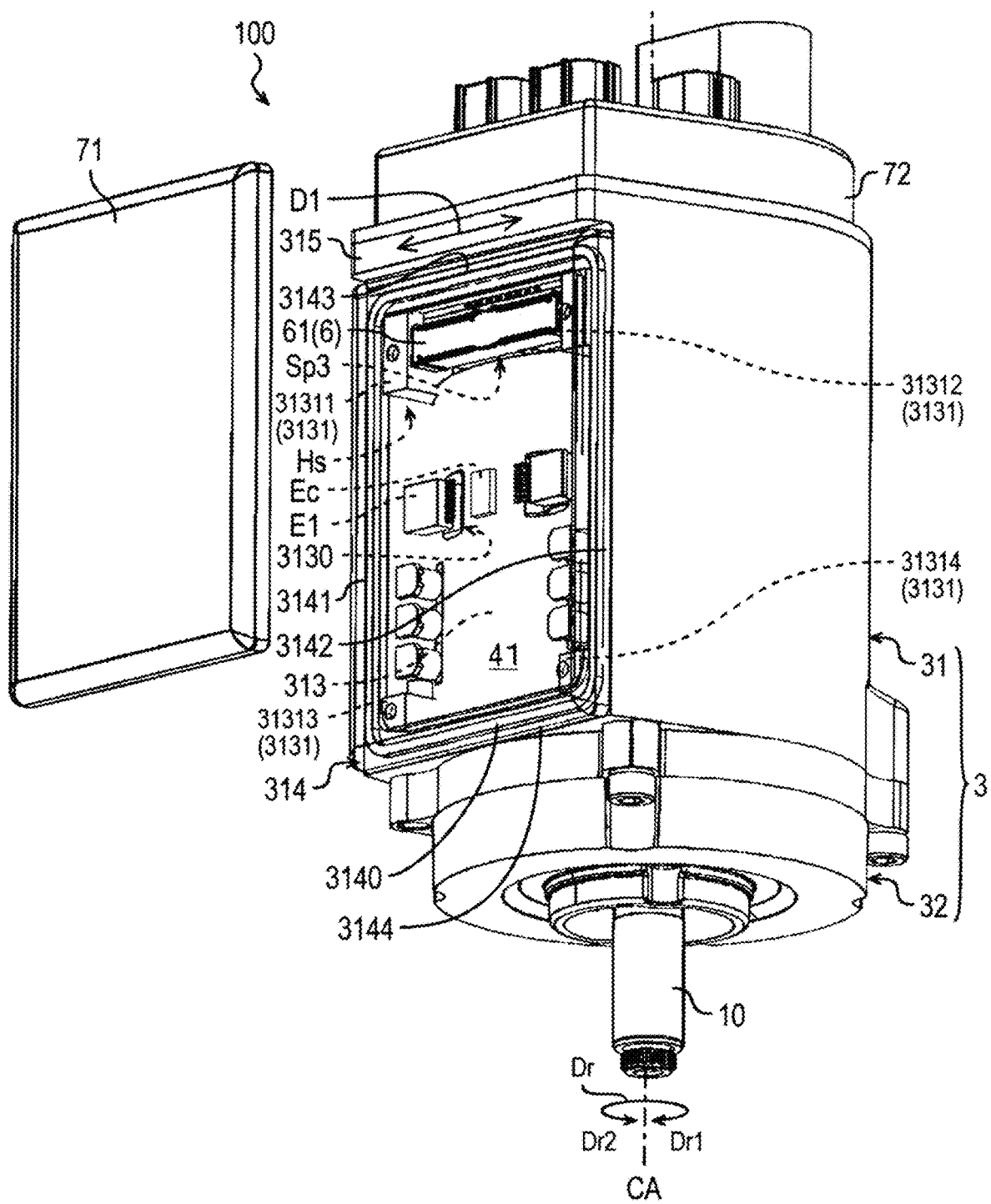
FIG. 1 is a perspective view of a motor assembly according to an example embodiment of the present disclosure.

Hereinafter, example embodiments and modifications thereof will be described with reference to the drawings.

In the present specification, in a motor assembly 100, a direction parallel to a center axis CA is referred to as an "axial direction", "axial", or "axially". Of the axial directions, a direction from a lower bearing Br2 to an upper bearing Br1 described later is referred to as "upward", and a direction from the upper bearing Br1 to the lower bearing Br2 is referred to as "downward". In each component, an end on the upper side is referred to as an "upper end" and an end on the lower side is referred to as a "lower end". Among surfaces of each component, a surface facing upward is referred to as an "upper surface", and a surface facing downward is referred to as a "lower surface".

A direction orthogonal to the center axis CA is referred as "radial direction", "radial", or "radially". Of the radial directions, a direction toward the center axis CA is referred as "radially inward", and a direction away from the center axis CA is referred as "radially outward". In each component, an end in the radially inward direction is referred to as a "radial inner end", and an end in the radially outward direction is referred to as a "radial outer end". Among side surfaces of each component, a side surface facing inward is referred to as a "radial inner surface", and a side surface facing outward is referred to as a "radial outer surface".

A direction of rotation about the center axis CA is referred to as a "circumferential direction Dr". Of the circumferential directions Dr, the counterclockwise direction facing downward and centered on the center axis CA is referred to as "one circumferential direction Dr1", and the clockwise direction facing downward and centered on the center axis CA is referred to as "the other circumferential direction Dr2". In each component, an end in the circumferential direction Dr is referred to as a "circumferential end". Further, an end in the one circumferential direction Dr1 is referred to as "one circumferential end", and an end in the other circumferential direction Dr2 is referred to as "the other circumferential end". Among side surfaces of each component, a side surface facing the circumferential direction Dr is referred to as a "circumferential side surface". Furthermore, a side surface facing the one circumferential direction Dr1 is referred to as "one circumferential side surface", and a side surface facing the other circumferential direction Dr2 is referred to as "the other circumferential side surface".

Further, in the present specification, an "annular shape" includes not only a shape continuously connected without any cut along the entire circumference in the circumferential direction Dr around the center axis CA but also a shape having one or more cuts in a part of the entire circumference around the center axis CA. The "annular shape" also includes a shape having a closed curve on a curved surface that intersects with the center axis CA around the center axis CA.

In the positional relationship between any one of the azimuth, line, and plane and another one of them, the term "parallel" indicates not only a state in which they do not intersect even if they extend endlessly but also a state in which they are substantially parallel. The terms "perpendicular" and "orthogonal" each include not only a state in which the both intersect at 90 degrees with each other but also a state in which the both are substantially perpendicular and a state in which the both are substantially orthogonal. That is, the terms "parallel", "vertical", and "orthogonal" each include a state in which the positional relationship between them has an angular deviation that does not depart from the gist of the present disclosure.

It should be noted that the matters described above are not strictly applied when incorporated in an actual device.

Figure 2:
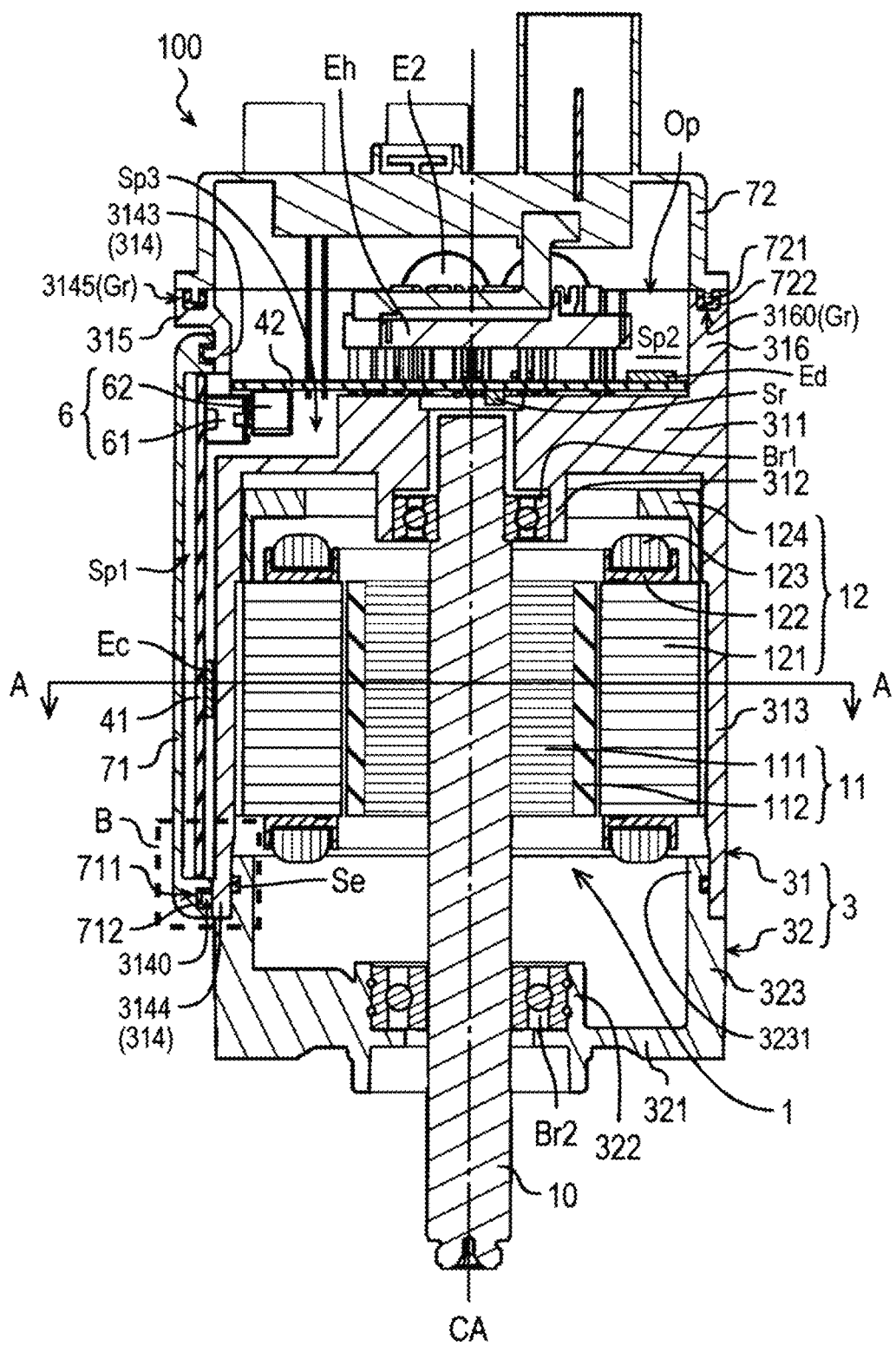
FIG. 2 is a cross-sectional view of a motor assembly according to an example embodiment of the present disclosure as viewed from the radial direction.
Figure 3:
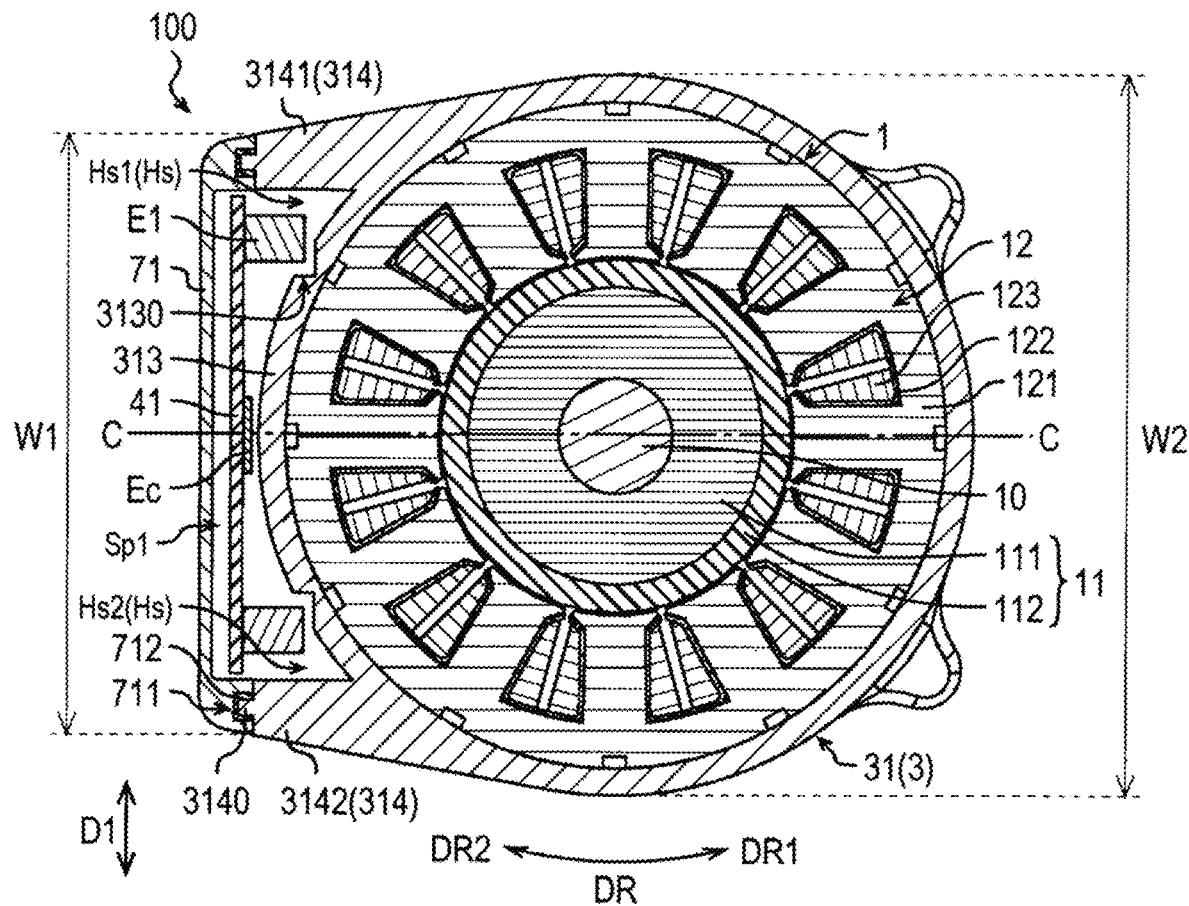
FIG. 3 is a cross-sectional view of a motor assembly according to an example embodiment of the present disclosure as viewed from the axial direction.

FIG. 1 is a perspective view of the motor assembly 100. FIG. 2 is a cross-sectional view of the motor assembly 100 as viewed from the radial direction. FIG. 3 is a cross-sectional view of the motor assembly 100 as viewed from the axial direction. In FIG. 1, a side substrate 41 is transparently displayed to make it easier to see the inside. FIG. 2 shows a cross-sectional structure of the motor assembly 100 when the motor assembly 100 is cut along a virtual plane including the center axis CA, and corresponds to a cross section taken along an alternate long and short dash line C-C in FIG. 3. FIG. 3 shows a cross-sectional structure of the motor assembly 100 when the motor assembly 100 is cut along a virtual plane perpendicular to the center axis CA, and corresponds to a cross section taken along a solid line A-A in FIG. 2.

As shown in FIGS. 1 to 3, the motor assembly 100 includes a motor 1, a housing 3, a plate-shaped side substrate 41, a plate-shaped upper substrate 42, a connector portion 6, and a cover member 7.

The motor 1 includes a shaft 10, a rotor 11, and a stator 12.

The shaft 10 is an axis of rotation of the rotor 11, supports the rotor 11, and is rotatable with the rotor 11 about the center axis CA. Note that the shaft 10 is not limited to the example in the example embodiment, and may be a fixed shaft attached to the stator 12. Note that when the shaft 10 is a fixed shaft, the rotor 11 is provided with a bearing (not shown) between the shaft 10 and the rotor 11.

The rotor 11 is rotatable with respect to the stator 12 about the center axis CA extending in the vertical direction. The rotor 11 includes a rotor core 111 and a magnet 112.

The rotor core 111 has an annular shape or a tubular shape surrounding the center axis CA, and is fixed to the radial outer surface of the shaft 10. The rotor core 111 is a magnetic body, and is a laminated body in which a plurality of electromagnetic steel plates are laminated in the axial direction in the present example embodiment.

The magnet 112 is held on the radial outer surface of the rotor core 111. The magnet 112 has a tubular shape surrounding the center axis CA and extends in the axial direction. Not limited to this example, the magnet 112 may have a configuration having a plurality of magnet pieces arranged in the circumferential direction Dr. The magnet 112 is located radially inward with respect to the stator 12, and faces the radial inner surface of the stator 12 in the radial direction. The magnet 112 is, for example, a rare earth sintered magnet such as a neodymium sintered magnet, and has a plurality of magnetic poles different from each other, that is, N poles and S poles. The N poles and S poles are arranged alternately in the circumferential direction.

The stator 12 has an annular shape surrounding the center axis CA and is held by the housing 3. The stator 12 drives and rotates the rotor 11 when the motor 1 is driven. The stator 12 includes a stator core 121, an insulator 122, a plurality of coils 123, and a bus bar 124.

The stator core 121 has an annular shape surrounding the center axis CA. The stator core 121 is a magnetic body, and is a laminated body in which a plurality of electromagnetic steel plates are laminated in the axial direction in the present example embodiment.

The insulator 122 covers a part of the stator core 121. The insulator 122 is formed of a material having electrical insulation such as synthetic resin, enamel, and rubber.

Each coil 123 is formed by winding a conductive wire (not denoted by a reference numeral) around the stator core 121 via the insulator 122. When a drive current is supplied to each coil 123, the stator 12 is excited and drives the rotor 11. The conductive wire is, for example, a metal wire covered with an insulating material, such as an enamel-coated copper wire.

The bus bar 124 is formed of a conductive material, and electrically connects the ends of the conductors extending from the respective coils 123. Further, the bus bar 124 is electrically connected to the upper substrate 42 via a connection line not shown. That is, each coil 123 is electrically connected to the upper substrate 42 via the bus bar 124. The stator 2 may not include the bus bar 124, without being limited to the example of the present example embodiment. In that case, the conductor of each coil 123 is, for example, directly electrically connected to the upper substrate 42.

Next, the housing 3 houses the motor 1 whose axis of rotation extends in the vertical direction. The housing 3 includes the upper housing 31 and the lower housing 32.

Further, as will be described later, a part of a side substrate accommodating chamber Sp1, an upper substrate accommodating chamber Sp2, and a passage space Sp3 are formed in the housing 3. The side substrate accommodating chamber Sp1 accommodates the side substrate 41. The upper substrate accommodating chamber Sp2 accommodates the upper substrate 42. The passage space Sp3 connects the side substrate accommodating chamber Sp1 and the upper substrate accommodating chamber Sp2. In this way, since the side substrate accommodating chamber Sp1 and the upper substrate accommodating chamber Sp2 are connected via the passage space Sp3, the side substrate 41 and the upper substrate 42 can be easily connected.

A configuration of the upper housing 31 will be described with reference to FIGS. 1 to 3. The upper housing 31 has an upper lid portion 311, an upper bearing holder 312, a tubular portion 313, a frame portion 314, a raised portion 315, and a peripheral wall portion 316. In other words, the housing 3 has the upper lid portion 311, the upper bearing holder 312, the tubular portion 313, the frame portion 314, the raised portion 315, and the peripheral wall portion 316.

The upper lid portion 311 covers the upper end of the tubular portion 313. The housing 3 has the upper lid portion 311. The upper lid portion 311 extends radially outward from the center axis CA.

The passage space Sp3 is formed in the upper lid portion 311. The passage space Sp3 is a recess formed at the radial outer end of the upper surface of the upper lid portion 311 and is recessed downward. More specifically, the passage space Sp3 is formed in a part, in the circumferential direction Dr, of the radial outer end of the upper surface of the upper lid portion 311. Further, the passage space Sp3 is recessed radially inward from the radial outer end of the upper lid portion 311 and opens upward. In other words, the passage space Sp3 is recessed downward from the upper surface of the upper lid portion 311 and opens radially outward.

Further, the upper lid portion 311 is provided with an opening (reference numeral omitted) surrounding the center axis CA.

The upper bearing holder 312 has a tubular shape and extends downward from the radial inner end of the upper lid portion 311 along the edge of the opening. The shaft 10 is inserted in the upper bearing holder 312 in the axial direction. The upper bearing Br1 is arranged on the radial inner surface of the upper bearing holder 312. The upper bearing holder 312 rotatably supports the upper portion of the shaft 10 via the upper bearing Br1. The upper bearing Br1 is a ball bearing in this example embodiment. However, the present disclosure is not limited to this example, and the upper bearing Br1 may be, for example, a sleeve bearing.

In this example embodiment, the upper bearing holder 312 is a different part of the same member as the upper lid portion 311. However, the present disclosure is not limited to the example of the present example embodiment, and the upper bearing holder 312 may be a separate body from the upper lid portion 311. For example, the upper bearing holder 312 may be a separate member integrally molded with at least the upper lid portion 311.

The peripheral wall portion 316 protrudes upward from a part of the radial outer end of the upper lid portion 311 other than the part facing the passage space Sp3, and extends in the circumferential direction. As a result, the upper substrate accommodating chamber Sp2 for accommodating the upper substrate 42 is formed radially inward with respect to the peripheral wall portion 316.

A recess 3160 is formed on the upper surface of the peripheral wall portion 316. The recess 3160 is recessed downward and extends in the circumferential direction Dr from one circumferential end to the other circumferential end of the peripheral wall portion 316.

The tubular portion 313 has a tubular shape extending in the axial direction, and extends downward from the radial outer end of the upper lid portion 311. The tubular portion 313 accommodates the motor 1 whose rotation axis extends in the vertical direction. As mentioned earlier, the housing 3 has the tubular portion 313.

The radial outer surface of the tubular portion 313 is provided with a recess 3130 for preventing contact with an electronic component E1, described later, having a longitudinal direction. The recess 3130 is recessed radially inward from the radial outer surface of the tubular portion 313. The recess 3130 faces an accommodation space Hs which will be described later. For example, by forming the recess 3130 in a region of the radial outer surface of the tubular portion 313 near the electronic component E1, the clearance between the electronic component E1 mounted on the side substrate 41 and the tubular portion 313 can be wider. Therefore, it is possible to make it difficult for the electronic component E1 to come into contact with the tubular portion 313.

The frame portion 314 protrudes radially outward from the radial outer surface of the tubular portion 313. The frame portion 314 forms a part of the side substrate accommodating chamber Sp1 inside thereof. As mentioned earlier, the housing 3 has the frame portion 314.

The frame portion 314 has a pair of side wall portions 3141 and 3142, an upper wall portion 3143, and a lower wall portion 3144. In the following description, one of the pair of side wall portions 3141 and 3142 may be referred to as a first side wall portion 3141 and the other may be referred to as a second side wall portion 3142.

The pair of side wall portions 3141 and 3142 protrude from the radial outer surface of the tubular portion 313 in a direction including at least the radially outward direction and the circumferential direction, and extend in the axial direction. More specifically, the first side wall portion 3141 protrudes from the radial outer surface of the tubular portion 313 in the direction including at least the radially outward direction and the one circumferential direction Dr1, and extends in the axial direction. The second side wall portion 3142 protrudes from the radial outer surface of the tubular portion 313 in the direction including at least the radially outward direction and the other circumferential direction Dr2, and extends in the axial direction. As described above, the frame portion 314 has the first side wall portion 3141 and the second side wall portion 3142.

The upper wall portion 3143 connects the radial outer end of the first side wall portion 3141 and the radial outer end of the second side wall portion 3142 at the upper parts of the first side wall portion 3141 and the second side wall portion 3142. As described above, the frame portion 314 has the upper wall portion 3143. In the present example embodiment, the upper wall portion 3143 connects the radial outer end of the upper end portion of the first side wall portion 3141 and the radial outer end of the upper end portion of the second side wall portion 3142. The upper wall portion 3143 extends in the first direction D1 and spreads in the axial direction. As shown in FIG. 1, the first direction D1 is a direction from the radial outer end of the upper end portion of the first side wall portion 3141 toward the radial outer end of the upper end portion of the second side wall portion 3142.

Recesses 3145 are formed on the upper surfaces of the pair of side wall portions 3141 and 3142 and the upper wall portion 3143. The recess 3145 is recessed downward and extends along the upper ends of the pair of side wall portions 3141 and 3142 and the upper end of the upper wall portion 3143. One end of the recess 3145 is connected to one circumferential end of the recess 3160 formed on the peripheral wall portion 316. The other end of the recess 3145 connects to the other circumferential end of the recess 3160. The recess 3145 and the recess 3160 form the groove Gr having a closed curve shape as viewed from the axial direction.

The lower wall portion 3144 connects the radial outer end of the first side wall portion 3141 and the radial outer end of the second side wall portion 3142 at the lower parts of the first side wall portion 3141 and the second side wall portion 3142. As described above, the frame portion 314 has the lower wall portion 3144. In the present example embodiment, the lower wall portion 3144 protrudes radially outward from the radial outer end of the tubular portion 313 and extends in the first direction D1. Further, the lower wall portion 3144 connects the radial outer end of the lower end portion of the first side wall portion 3141 and the radial outer end of the lower end portion of the second side wall portion 3142.

Further, a protrusion 3140 protruding radially outward is formed at the radial outer end of the frame portion 314. In the present example embodiment, the protrusion 3140 has a closed curved shape extending along the radial outer end of the frame portion 314 as viewed from the radial direction in which the frame portion 314 protrudes.

Further, the upper wall portion 3143 has a raised portion 315. In other words, the housing 3 has the raised portion 315. The raised portion 315 protrudes radially outward at the upper end of the radial outer surface of the upper wall portion 3143 and extends in the first direction D1 described above. The raised portion 315 is arranged above the protrusion 3140 formed at the radial outer end of the frame portion 314 and a side cover portion 71. In this way, the raised portion 315 can protect the upper end of the side cover portion 71, the contact portion between the outer edge of the side cover portion 71 as viewed from the radial direction, and the housing 3.

The raised portion 315 and the tubular portion 313 are different parts of the same member, respectively, and in the present example embodiment, they are different parts of the upper housing 31.

Next, as shown in FIG. 3, the accommodation space Hs for accommodating the electronic component E1 is provided between the tubular portion 313 and the pair of side wall portions 3141 and 3142 as viewed from the axial direction. More specifically, an accommodation space Hs1 is provided between the tubular portion 313 and the first side wall portion 3141, and an accommodation space Hs2 is provided between the tubular portion 313 and the second side wall portion 3142.

In this way, even if a large-sized electronic component E1 having a longitudinal direction such as a capacitor or a regulator of a microcomputer is mounted on the side substrate 41, the electronic component E1 can be accommodated in the accommodation space Hs. Therefore, it is possible to suppress an increase in the size of the motor assembly 100 in the direction in which the mounting surface of the component E1 faces. For example, in the present example embodiment, since the mounting surface of the electronic component E1 on the side substrate 41 faces radially inward, it is possible to suppress an increase in the radial size of the motor assembly 100. Therefore, the motor assembly 100 can be downsized as compared with the configuration in which the electronic component E1 mounted on the side substrate 41 is not accommodated in the accommodation space Hs.

Further, the weight of the housing 3 can be reduced as compared with the configuration in which the space between the tubular portion 313 and the pair of side wall portions 3141 and 3142 is filled with the material of the housing 3, so that the weight of the motor assembly 100 can be reduced.

In the accommodation space Hs, in a portion where at least the side surface of the first side wall portion 3141 facing the tubular portion 313 in the radial direction is connected to the radial outer surface of the tubular portion 313, the side surface and radial outer surface of the tubular portion 313 forms an acute angle as viewed from the axial direction. Similarly, in a portion where at least the side surface of the second side wall portion 3142 facing the tubular portion 313 in the radial direction is connected to the radial outer surface of the tubular portion 313, the side surface and the radial outer surface of the tubular portion 313 forms an acute angle as viewed from the axial direction. In this way, a gap serving as the above-mentioned accommodation space Hs can be formed between the above-mentioned side surface of the first side wall portion 3141 and a region of the radial outer surface of the tubular portion 313 that faces at least the first side wall portion 3141 in the radial direction. Further, a gap serving as the above-mentioned accommodation space Hs can be formed between the above-mentioned side surface of the second side wall portion 3142 and a region of the radial outer surface of the tubular portion 313 that faces at least the second side wall portion 3142 in the radial direction.

Figure 4:
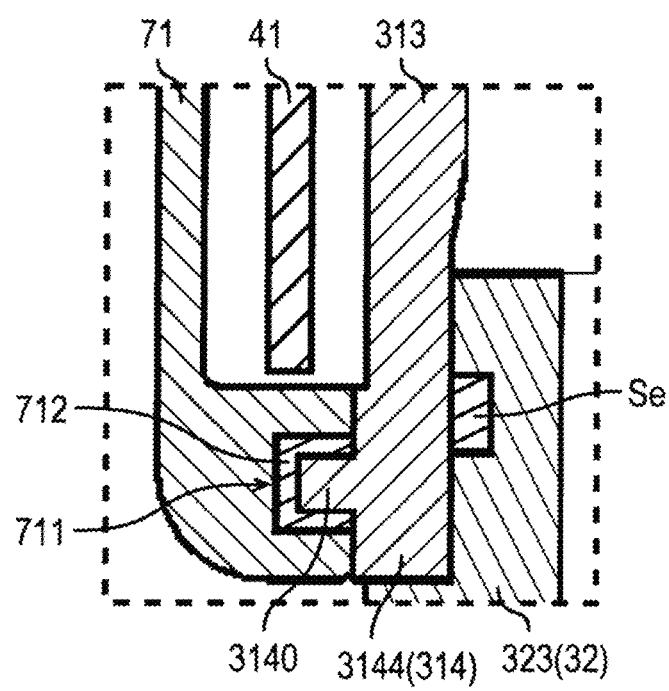
FIG. 4 is an enlarged view of a portion of a connection portion according to an example embodiment of the present disclosure between an upper housing and a lower housing.

Next, a configuration of the lower housing 32 will be described with reference to FIGS. 1 to 4. FIG. 4 is a partial enlarged view of the connection portion between the upper housing 31 and the lower housing 32. Note that FIG. 4 is an enlargement of a portion B surrounded by the broken line in FIG. 2.

The lower housing 32 is a lower lid portion that covers the lower end of the tubular portion 313. As described above, the housing 3 has the lower housing 32. The lower housing 32 has a bottom plate portion 321, a lower bearing holder 322, and a peripheral wall portion 323. In other words, the housing 3 has a bottom plate portion 321, a lower bearing holder 322, and a peripheral wall portion 323.

The bottom plate portion 321 extends radially outward from the center axis CA. The bottom plate portion 321 is provided with an opening (reference numeral omitted) surrounding the center axis CA.

The lower bearing holder 322 has a tubular shape and extends upward from the radial inner end of the bottom plate portion 321 along the edge of the opening. The shaft 10 is inserted in the lower bearing holder 322 in the axial direction. The lower bearing Br2 is arranged on the radial inner surface of the lower bearing holder 322. The lower bearing holder 322 rotatably supports the lower portion of the shaft 10 via the lower bearing Br2. The lower bearing Br2 is a ball bearing in this example embodiment. However, the present disclosure is not limited to this example, and the lower bearing Br2 may be, for example, a sleeve bearing.

In this example embodiment, the lower bearing holder 322 is a different part of the same member as the bottom plate portion 321. However, the present disclosure is not limited to the example, and the lower bearing holder 322 may be a separate body from the bottom plate portion 321. For example, the lower bearing holder 322 may be a separate member integrally molded at least with the bottom plate portion 321.

The peripheral wall portion 323 protrudes upward from the radial outer end of the bottom plate portion 321, and extends in the circumferential direction. As shown in FIG. 4, the upper end of the peripheral wall portion 323 is connected to the lower end of the tubular portion 313. More specifically, a protruding wall portion 3231 is formed at the upper end of the peripheral wall portion 323. The protruding wall portion 3231 has a tubular shape and protrudes upward at the upper end of the peripheral wall portion 323. The protruding wall portion 3231 is fitted into the lower end of the tubular portion 313.

In this fitting portion, it is preferable that the protruding wall portion 3231 is fitted into the lower end of the tubular portion 313 via a sealing member Se, as in the present example embodiment. That is, the lower end of the tubular portion 313 is connected to the lower housing 32 via the seal member Se. As the seal member Se, for example, a silicone-based sealing material, or a gasket such as an O-ring or an X-ring can be used. In this way, the seal member Se can connect the lower end of the tubular portion 313 and the lower housing 32 without a gap. Therefore, the waterproof and dustproof properties at the connecting portion between the two can be further improved. However, the present disclosure is not limited to this example. In the abovementioned fitting portion, the protruding wall portion 3231 may be directly fitted into the lower end of the tubular portion 313.

Next, the side substrate 41 and the upper substrate 42 will be described with reference to FIGS. 1 to 3.

The side substrate 41 faces the radial outer end surface of the tubular portion 313 in the radial direction, and the side substrate 41 extends in a direction intersecting the upper substrate 42. In this example embodiment, the side substrate 41 extends parallel to the axial direction.

The side substrate 41 is fixed to the radial outer surface of the tubular portion 313. In this way, even if the motor 1 vibrates, the side substrate 41 can be stably fixed.

In the present example embodiment, the side substrate 41 is screwed to the radial outer surface of the tubular portion 313. The side substrate 41 can be more reliably fixed to the tubular portion 313 by screwing. More specifically, the side substrate 41 is screwed to the pedestal portion 3131 of the tubular portion 313 using screws (reference numerals omitted). That is, the tubular portion 313 has the pedestal portion 3131. The pedestal portion 3131 protrudes radially outward on the radial outer surface of the tubular portion 313. In FIG. 1, the pedestal portion 3131 includes a first pedestal portion 31311, a second pedestal portion 31312, a third pedestal portion 31313, and a fourth pedestal portion 31314. The first pedestal portion 31311 and the second pedestal portion 31312 protrude radially outward and extend upward at the upper end of the radial outer surface of the tubular portion 313. The third pedestal portion 31313 and the fourth pedestal portion 31314 protrude radially outward at the lower end of the radial outer surface of the tubular portion 313. In the axial direction, the first pedestal portion 31311 and the second pedestal portion 31312 directly face the lower surface of the upper wall portion 3143 of the frame portion 314. Further, the third pedestal portion 31313 and the fourth pedestal portion 31314 directly face the upper surface of the lower wall portion 3144. Further, in the circumferential direction Dr, the first pedestal portion 31311 and the third pedestal portion 31313 directly face one end surface in the circumferential direction of the first side wall portion 3141. Further, the second pedestal portion 31312 and the fourth pedestal portion 31314 directly face the other end face in the circumferential direction of the second side wall portion 3142. In FIG. 1, the side substrate 41 is screwed to the first pedestal portion 31311, the second pedestal portion 31312, the third pedestal portion 31313, and the fourth pedestal portion 31314.

Figure 5A:
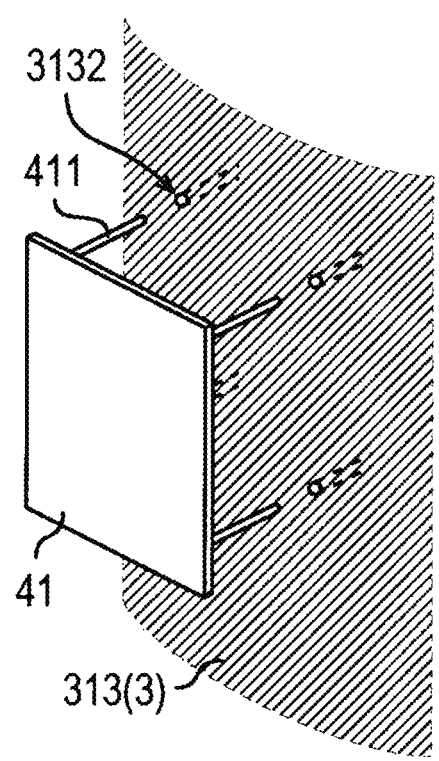
FIG. 5A shows a modification of a fixing structure of a side substrate according to an example embodiment of the present disclosure.
Figure 5B:
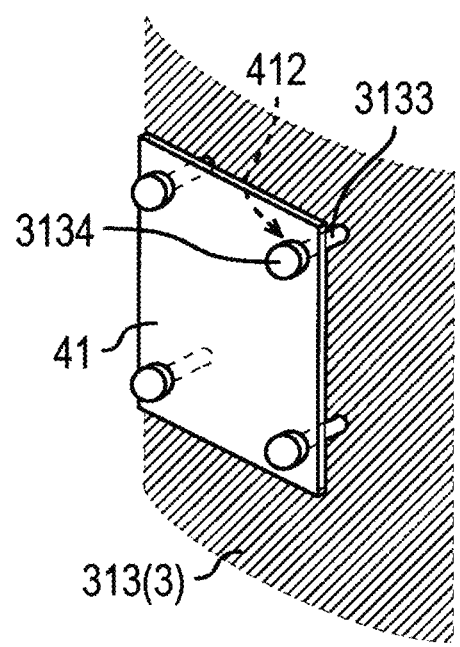
FIG. 5B shows another modification of a fixing structure of a side substrate according to an example embodiment of the present disclosure.

However, the fixing structure of the side substrate 41 is not limited to this example. FIGS. 5A and 5B show modifications of the fixing structure of the side substrate 41. Note that in FIGS. 5A and 5B, the tubular portion 313 does not have the pedestal portion 3131.

For example, in FIG. 5A, the side substrate 41 has a protrusion 411. The protrusion 411 protrudes radially inward from the radial inner surface of the side substrate 41. A hole 3132 is formed on the radial outer surface of the tubular portion 313. In FIG. 5A, the hole 3132 is a recess recessed radially inward, and is formed on the radial outer surface of the tubular portion 313. The side substrate 41 is fixed to the tubular portion 313 by fitting the protrusion 411 into the hole 3132.

Not limited to the example of FIG. 5A, a protrusion may be formed on the radial outer surface of the tubular portion 313, and a hole such as a through hole may be formed on the side substrate 41. That is, one of the radial inner surface of the side substrate 41 and the radial outer surface of the tubular portion 313 may be provided with a protrusion that protrudes from one to the other along the radial direction. Further, the other of the radial inner surface of the side substrate 41 and the radial outer surface of the tubular portion 313 may be provided with a hole extending from the other to one along the radial direction. By fitting the protrusion into the hole, the side substrate 41 is fixed to the radial outer surface of the tubular portion 313. For example, by fitting a protrusion such as a press-fit pin into the hole, the side substrate 41 can be fixed to the radial outer surface of the housing 3 with a simpler configuration.

Further, in FIG. 5B, the tubular portion 313 has a protruding portion 3133 and a caulking portion 3134. The side substrate 41 has a through hole 412. The protruding portion 3133 is made of a metal such as μl, is provided on the radial outer surface of the tubular portion 313, and protrudes radially outward. The through hole 412 is a hole formed in the side substrate 41 and penetrates the side substrate 41 in the radial direction. The caulking portion 3134 is a portion in which the radial outer end of the protruding portion 3133 penetrating through the through hole 412 is crushed. That is, with the caulking portion 3134 provided at the tip of the protruding portion 3133 inserted into the through hole 412 on the radially outward side from the radial outer surface of the side substrate 41, the side substrate 41 is fixed to the radial outer surface of the housing 3. In this way, the side substrate 41 can be more reliably fixed to the radial outer surface of the housing 3 without increasing the number of parts.

The upper substrate 42 extends in the direction perpendicular to the axial direction and is disposed above the motor 1. The upper substrate 42 is accommodated in the upper substrate accommodating chamber Sp2. The upper substrate 42 is disposed above the upper lid portion 311. In this example embodiment, the upper substrate 42 is fixed to the upper surface of the upper lid portion 311 of the housing 3. In this way, the upper substrate 42 can dissipate heat to the upper lid portion 311. That is, the upper lid portion 311 can function as a heat sink for the upper substrate 42. This effect is particularly effective when the upper lid portion 311 is made of metal.

Further, the upper substrate 42 is disposed radially inward with respect to the upper wall portion 3143. That is, the upper substrate 42 is located radially inward with respect to the radial inner surface of the upper wall portion 3143. That is, as viewed from the axial direction, the upper substrate 42 does not overlap with the upper wall portion 3143. In this way, when the upper substrate 42 is accommodated in the upper substrate accommodating chamber Sp2, the upper substrate 42 is unlikely to hit the upper wall portion 3143. Therefore, by moving the upper substrate 42 from above to below the upper substrate accommodating chamber Sp2, the upper substrate 42 can be accommodated in the upper substrate accommodating chamber Sp2 without the upper substrate 42 hitting the upper wall portion 3143. Therefore, the upper substrate 42 can be easily accommodated in the upper substrate accommodating chamber Sp2.

Further, the upper substrate 42 is electrically connected to the outside of the motor assembly 100 via a connection portion (not shown) formed in the upper cover portion 72. In this way, for example, it is not necessary to provide a connection portion of the motor assembly 100 with the outside on the radial outer surface of the side substrate 41, so that the radial size of the motor assembly 100 can be further reduced.

In the present example embodiment, the above-mentioned connection portion is a part of the upper cover portion 72. However, the present disclosure is not limited to the example, and the connection portion may be a member different from the upper cover portion 72. For example, the connection portion may have a terminal that electrically connects the upper substrate 42 and the outside, and a resin or metal holding member that holds the terminal. One end of the terminal is electrically connected to the upper substrate 42 or a mounted component on the upper substrate 42. The other end of the terminal is exposed to the outside of the motor assembly 100 and can be electrically connected to the outside of the motor assembly 100. The holding member is attached to a connection hole formed in the upper cover portion 72 and closes the connection hole. For example, the holding member is fitted into the connection hole after the upper cover portion 72 is attached to the upper housing 31. Preferably, the holding member is fitted into the connection hole via the seal member.

As shown in FIG. 2, the motor assembly 100 includes a detection unit Sr, a control device Ec, a drive circuit Ed, and electronic components E1 and E2.

The detection unit Sr is a sensor that detects the rotation angle position of the rotor 11 included in the motor 1. In the present example embodiment, the detection unit Sr is mounted on the upper substrate 42 and transmits a detection result of the rotation angle position to the control device Ec via the connector portion 6. However, the present disclosure is not limited to the example, and the detection unit Sr may be mounted on the side substrate 41. Preferably, as in the present example embodiment, the detection unit Sr is mounted on the substrate on which the drive circuit Ed is mounted.

The control device Ec controls the drive of the motor 1. In the present example embodiment, the control device Ec that controls the drive of the motor 1 is mounted on the side substrate 41. By mounting a control device Ec such as a microcomputer on the side substrate 41, heat can be dissipated from the control device Ec to the tubular portion 313 of the housing 3. This effect is particularly effective when the tubular portion 313 is made of metal. Further, as compared with the configuration in which the control device Ec is mounted on the upper substrate 42, it is possible to suppress an increase in size of the upper substrate 42.

The control device Ec is electrically connected to a drive circuit Ed described later mounted on the upper substrate 42 via the connector portion 6. For example, the control device Ec calculates the drive instruction of the motor 1 based on the detection result of the rotation angle position transmitted from the detection unit Sr via the connector portion 6, and transmits the drive instruction to the drive circuit Ed via the connector portion 6. As described above, in the present example embodiment, transmission of the detection result of the rotation angle position from the detection unit Sr of the upper substrate 42 to the control device Ec of the side substrate 41, and transmission of the drive instruction from the control device Ec of the side substrate 41 to the drive circuit Ed of the upper substrate 42 can be performed with one connector portion 6. Since the number of parts is smaller than a configuration in which each transmission is performed by a separate member, workability in the connection process between the side substrate 41 and the upper substrate 42 is improved.

The drive circuit Ed drives the motor 1 by supplying a drive current to the stator 12. The drive circuit Ed of the motor 1 is mounted on the upper substrate 42. The drive circuit Ed is controlled by the control device Ec mounted on the side substrate 41. For example, the drive circuit Ed drives the motor 1 based on a drive instruction transmitted from the control device Ec via the connector portion 6. By mounting the drive circuit Ed of the motor on the upper substrate 42 that is separate from the side substrate 41 on which the control device Ec is mounted, the control device Ec is less likely to be affected by the electromagnetic noise generated in the drive circuit Ed. Therefore, the control device Ec can operate more accurately.

Note that the control device Ec may be mounted on the upper substrate 42 without being limited to the above-mentioned example. And/or the drive circuit Ed may be mounted on the side substrate 41. Preferably, the drive circuit Ed of the motor 1 may be mounted on one of the side substrate 41 and the upper substrate 42. Further, the control device Ec for controlling the drive circuit Ed may be mounted on the other of the side substrate 41 and the upper substrate 42. With such a configuration, since the control device Ec is mounted on the other substrate other than the one substrate on which the drive circuit Ed of the motor 1 is mounted, the control device Ec is less likely to be affected by the electromagnetic noise generated in the drive circuit Ed. Therefore, the control device Ec can operate more accurately.

The electronic component E1 is mounted on the side substrate 41. The electronic component E1 has a shape having a longitudinal direction, and extends radially inward from the radial inner surface of the side substrate 41. At least the radial inner end of the electronic component E1 is accommodated in the accommodation space Hs. Further, in the vicinity of the radial inner end of the electronic component E1, the recess 3130 for contact prevention is provided on the radial outer surface of the tubular portion 313. The electronic component E1 includes, for example, a large-sized electronic component such as a regulator, a film capacitor, or an electrolytic capacitor that outputs a constant voltage to the control device Ec or the like. When the electronic component E1 having a longitudinal direction is mounted on the substrate, the size of the motor assembly 100 in the normal direction of the mounting surface of the side substrate 41 tends to increase. By accommodating the electronic component E1 mounted on the side substrate 41 in the accommodation space Hs, it is possible to suppress an increase in size of the motor assembly 100.

Further, the electronic component E2 has a shape having a longitudinal direction in a direction parallel to the upper substrate 42, and is installed in a component holder Eh mounted on the upper substrate 42. The electronic component E2 is a large-sized electronic component such as a film capacitor or an electrolytic capacitor, and is electrically connected to the upper substrate 42 via the component holder Eh.

By installing the electronic component E2 in the component holder Eh, for example, it is possible to prevent the electronic component E2 moved by its own weight from coming into contact with the upper substrate 42. For example, if the electrolytic capacitor is turned sideways and mounted directly on the upper substrate 42, it may gradually fall downward due to its own weight, so that it may come into direct contact with the upper substrate 42. Such contact can be avoided by installing the electronic component E2 in the component holder Eh. The electronic component E2 may be fixed to the component holder Eh using an adhesive. By doing so, the movement of the electronic component E2 can be suppressed more effectively, so that the above-mentioned contact can be more reliably avoided.

The component holder Eh is made of resin in this example embodiment. The above-mentioned component holder Eh is integrally molded with a conductive member (reference numeral omitted) that electrically connects the connection portion of the upper cover portion 72 and the upper substrate, and a bus bar for electronic components (reference numeral omitted) that electrically connects a plurality of electronic components E2 to each other. That is, the above-mentioned conductive member and the bus bar for electronic components are fixed by the component holder Eh.

In this way, by mounting the component holder Eh on the upper substrate 42, it is possible to position the conductive member and the bus bar for electronic components more accurately. Therefore, the electrical connection between the conductive member and the bus bar for electronic components can be more reliably performed, and the connection work becomes easier. Further, it is possible to avoid a possibility that the conductive member and the bus bar for electronic components come into contact with an unintended member.

Further, since the conductive member and the bus bar for electronic components are molded with resin, it is possible to avoid a short circuit between the conductive member and the electronic component E2 or the bus bar for electronic components.

In the present example embodiment, as described above, the electronic components E1 and E2 having the longitudinal direction are mounted on both the side substrate 41 and the upper substrate 42. However, the present disclosure is not limited to this example, and an electronic component having a longitudinal direction may be mounted on one of the side substrate 41 and the upper substrate 42. That is, at least one of the side substrate and the upper substrate 42 may be equipped with electronic components having a longitudinal direction.

Preferably, the longitudinal direction of the electronic components E1 and E2 is parallel to the direction in which one of the above substrates on which the electronic components E1 and E2 are mounted spreads. In this way, for example, even if an electronic component having a longitudinal direction is mounted on the side substrate 41, it is possible to suppress an increase in the radial size of the space required for arranging the side substrate 41. Further, even if the electronic components E1 and E2 having the longitudinal direction are mounted on the upper substrate 42 extending in the direction perpendicular to the axial direction, it is possible to suppress an increase in the axial size of the space required for arranging the upper substrate 42. Therefore, it is possible to suppress an increase in size of the motor assembly 100.

Next, the connector portion 6 will be described with reference to FIGS. 1 to 3. The connector portion 6 electrically connects the upper substrate 42 and the side substrate 41. More specifically, the connector portion 6 electrically connects the wiring pattern formed on the upper substrate 42 and the wiring pattern formed on the side substrate 41. For example, the detection unit Sr and the drive circuit Ed mounted on the upper substrate 42 are electrically connected to the control device Ec via one connector portion 6. In the present example embodiment, the connector portion 6 carries out signal transmission from the side substrate 41 to the upper substrate 42 and signal transmission from the upper substrate 42 to the side substrate 41. However, the present disclosure is not limited to this example, and the number of connector portions 6 may be plural. For example, in the motor assembly 100, a connector portion that carries out signal transmission from the side substrate 41 to the upper substrate 42 and a connector portion that carries out signal transmission from the upper substrate 42 to the side substrate 41 may be provided separately. Alternatively, the plurality of connector portions 6 may each perform bidirectional signal transmission.

As viewed from the axial direction, the connector portion 6 overlaps with the housing 3. Preferably, as viewed from the axial direction, the entire connector portions 6 overlaps with the housing 3. In this way, the radial size of the motor assembly 100 can be made smaller than the configuration in which the entire connector portion 6 is located outside the housing 3 as viewed from the axial direction. Therefore, the motor assembly 100 can be downsized.

Further, as viewed from the axial direction, a part of the connector portion 6 overlaps with the tubular portion 313. In this way, the radial size of the motor assembly 100 can be made smaller than that in the configuration in which the connector portion 6 is arranged radially outward from the tubular portion 313.

Further, inside the housing 3, the upper substrate 42 is electrically connected to the connector portion 6. In this way, the motor assembly 100 can be downsized as compared with the configuration in which the upper substrate 42 is electrically connected to the connector portion 6 outside the housing 3.

Further, the connector portion 6 is housed in the passage space Sp3 formed in the upper lid portion 311. In this way, the side substrate 41 and the upper substrate 42 can be electrically connected by the connector portion 6 through the passage space Sp3. Therefore, the axial size of the motor assembly 100 can be further reduced as compared with the configuration in which the connector portion 6 is disposed above the upper lid portion 311.

Further, the connector portion 6 is disposed on the motor 1 side in the axial direction with respect to the upper substrate 42. In this way, for example, the connector portion 6 can be connected to the lower surface of the upper substrate 42. Therefore, the axial size of the motor assembly 100 can be made smaller.

Next, the connector portion 6 has a connector 61 and a connector 62. The connector 61 is mounted on the side substrate 41 and is electrically connected to the wiring pattern of the side substrate 41. The connector 62 is mounted on the upper substrate 42 and is electrically connected to the wiring pattern of the upper substrate 42.

In this example embodiment, the connector 61 and the connector 62 face each other in the radial direction and are electrically connected to each other. In this case, for example, after the upper substrate 42 is attached to the housing 3, the side substrate 41 is moved in the radial direction and attached to the housing 3. Since the connector 61 and the connector 62 face each other in the radial direction at the time of the attachment, the connector 61 can be electrically connected to the connector 62 as the side substrate 41 moves. That is, it is not necessary to electrically connect the connector 61 and the connector 62 separately from the attachment of the side substrate 41. Therefore, the number of assembly steps of the motor assembly 100 can be reduced. Accordingly, productivity of the motor assembly 100 can be improved.

More specifically, the connector 61 has a female terminal (not shown) that is recessed radially outward. The connector 62 has a male terminal (not shown) that protrudes radially outward. Alternatively, the connector 61 may have a male terminal that protrudes radially inward, and the connector 62 may have a female terminal that is recessed radially inward. The male terminal is fitted into the female terminal by moving the side substrate 41 radially inward and attaching it to the housing 3 with the male terminal and the female terminal facing each other in the radial direction. As a result, the connector 61 and the connector 62 are conducted, and the side substrate 41 and the upper substrate 42 are electrically connected.

The connector 61 and the connector 62 may face each other in the axial direction and be electrically connected to each other without being limited to the examples of the present example embodiment. In that case, for example, after the side substrate 41 is attached to the housing 3, the upper substrate 42 is moved in the axial direction and attached to the housing 3. Since the connector 61 and the connector 62 face each other in the axial direction during the attachment, the connector 61 can be electrically connected to the connector 62 as the upper substrate 42 moves. That is, it is not necessary to electrically connect the connector 61 and the connector 62 separately from the attachment of the upper substrate 42. Therefore, the number of assembly steps of the motor assembly 100 can be reduced. Accordingly, productivity of the motor assembly 100 can be improved.

More specifically, the connector 61 may have a female terminal that is recessed downward, and the connector 62 may have a male terminal that protrudes downward. Alternatively, the connector 61 may have a male terminal that protrudes upward, and the connector 62 may have a female terminal that is recessed upward. By moving the upper substrate 42 downward and attaching it to the housing 3 with the male terminal and the female terminal facing each other in the axial direction, the male terminal is fitted into the female terminal. As a result, the connector 61 and the connector 62 are conducted, and the side substrate 41 and the upper substrate 42 are electrically connected.

Next, the cover member 7 will be described with reference to FIGS. 1 to 3. The cover member 7 has a side cover portion 71 that covers the radial outer end surface of the side substrate 41, and an upper cover portion 72 that covers the upper surface of the upper substrate 42. The outer edge of the side cover portion 71 as viewed from the radial direction is in contact with the housing 3 via the seal member 712. Further, the outer edge of the upper cover portion 72 as viewed from the axial direction is in contact with the housing 3 via the seal member 722.

When the side substrate 41 faces the radial outer end surface of the tubular portion 313 in the radial direction and the upper substrate 42 extending perpendicular to the axial direction is disposed above the motor 1, it is necessary to consider the waterproof and dustproof properties of both the portion where the outer edge of the side cover portion 71 as viewed from the radial direction is in contact with the housing 3 in the radial direction and the portion where the outer edge of the upper cover portion 72 as viewed from the axial direction is in contact with the housing 3 in the axial direction. As described above, by bringing the outer edge of the side cover portion 71 as viewed from the radial direction and the outer edge of the upper cover portion 72 as viewed from the axial direction into contact with the housing 3 via the seal members 712 and 722 without a gap, it is possible to further enhance the waterproof and dustproof properties of the contact portion between the cover member 7 and the housing 3, and to protect the side substrate 41 and the upper substrate 42 from water, dust and the like.

As shown in FIG. 3, the side cover portion 71 extends in a direction intersecting the direction from the center axis CA toward the central portion of the side cover portion 71 as viewed from the axial direction. The side cover portion 71 is attached to the radial outer end of the frame portion 314. More specifically, the outer edge of the side cover portion 71 as viewed from the radial direction is in contact with the radial outer end of the first side wall portion 3141, the radial outer end of the second side wall portion 3142, the radial outer end of the upper wall portion 3143, and the radial outer end of the lower wall portion 3144. In this way, the side substrate 41 can be accommodated in the side substrate accommodating chamber Sp1 surrounded by the frame portion 314 and the side cover portion 71. Further, the frame portion 314 and the side cover portion 71 can protect the side substrate 41 accommodated in the side substrate accommodating chamber Sp1 from water, dust, and the like outside the housing 3.

In the present example embodiment, the outer edge of the side cover portion 71 as viewed from the radial direction is in contact with the radial outer end of the frame portion 314 via the seal member 712. As the seal member 712, for example, a silicone-based sealing material, a gasket such as an O-ring or an X-ring can be used. In this way, the inside of the frame portion 314 can be closed by the side cover portion 71. Therefore, the side substrate 41 disposed in the side substrate accommodating chamber Sp1 surrounded by the tubular portion 313, the frame portion 314, and the side cover portion 71 can be protected by the side cover portion 71.

A recess 711 is formed on the outer edge of the side cover portion 71 as viewed from the radial direction. The recess 711 is recessed radially outward from the outer edge and extends along the outer edge. The protrusion 3140 of the frame portion 314 fits into the recess 711. In the present example embodiment, the recess 711 has a closed curved shape formed throughout the outer edge as viewed from the radial direction. However, the present disclosure is not limited to this example, and the recess 711 and the protrusion 3140 do not have to have a closed curved shape as viewed from the radial direction. For example, the recess 711 may be formed in a part of the outer edge portion. Further, it may be formed on a part of the radial outer end of the frame portion 314.

Preferably, the protrusion 3140 fits into the recess 711 via the seal member 712. More preferably, the seal member 712 is disposed between the protrusion 3140 and the recess 711 throughout the outer edge of the side cover portion 71 as viewed from the radial direction. In this way, the connection portion between the side cover portion 71 and the radial outer end of the frame portion 314 can be sealed with the seal member 712. Therefore, the ingress of water, dust, and the like at the connection portion can be suppressed more effectively. Therefore, the side substrate 41 disposed in the side substrate accommodating chamber Sp1 surrounded by the frame portion 314 and the side cover portion 71 can be protected from water, dust, and the like from the outside of the upper housing 31 and the side cover portion 71.

Note that the present disclosure is not limited to the example of the present example embodiment, and a protrusion protruding radially inward may be provided to the outer edge of the side cover portion 71 as viewed from the radial direction. In that case, the frame portion 314 of the housing 3 is provided with a recess that is recessed radially inward and into which the protrusion fits. That is, it is sufficient that one of the outer edge of the side cover portion 71 as viewed from the radial direction and the housing 3 has a first protrusion protruding from one toward the other. Further, it is sufficient that the other of the outer edge of the side cover portion 71 as viewed from the radial direction and the housing 3 has a first recess that is recessed from one toward the other. Note that the first protrusion is fitted into the first recess. Then, preferably, the seal member 712 may be disposed between the first protrusion and the first recess. In this way, a labyrinth structure in which the first protrusion is fitted in the first recess can be formed between the outer edge of the side cover portion 71 as viewed from the radial direction and the housing 3. Further, the labyrinth structure can be sealed with the seal member 712. Therefore, the waterproof and dustproof properties of the labyrinth structure can be further enhanced.

Alternatively, the first protrusion described above may not be provided. For example, in FIG. 2, the recess 711 may be provided, while the protrusion 3140 may not be provided. In that case, the outer edge of the side cover portion 71 as viewed from the radial direction comes into contact with the radial outer end of the frame portion 314 via the seal member 712 partially housed in the recess 711. Even in this way, the side cover portion 71 can protect the side substrate 41 accommodated in the side substrate accommodating chamber Sp1.

Further, the side cover portion 71 is provided below the raised portion 315 and above the lower end of the tubular portion 313. In this way, since the side cover portion 71 can be attached to the upper housing 31 of the integrated structure including the raised portion and the tubular portion, the seal structure by the side cover portion 71 can be easily formed.

Further, preferably, the contact portion between the outer edge of the side cover portion 71 as viewed from the radial direction and the housing 3 is disposed at the same radial position as the radial outer end of the raised portion 315, or radially inward with respect to the radial outer end of the raised portion 315. In this way, it is possible to prevent the contact portion from protruding radially outward from the radial outer end of the raised portion 315 that protects the upper end of the side cover portion 71. Therefore, even if the side substrate 41 is covered with the side cover portion 71, it is possible to suppress an increase in the radial size of the motor assembly 100.

More preferably, the radial outer end of the side cover portion 71 is disposed at the same radial position as the radial outer end of the raised portion 315, or radially inward with respect to the radial outer end of the raised portion 315. In this way, it is possible to prevent the side cover portion 71 from protruding radially outward from the radial outer end of the raised portion 315. Therefore, it is possible to further suppress an increase in the radial size of the motor assembly 100.

More preferably, the radial outer end of the side cover portion 71 is disposed at the same radial position as the radial outer end of the raised portion 315. In this way, it is possible to suppress an increase in the radial size of the raised portion 315 while protecting the upper end of the side cover portion 71 with the raised portion 315. Therefore, an increase in the radial size of the motor assembly 100 can be suppressed more effectively.

The width of the side cover portion 71 in the first direction D1 is preferably equal to or less than the width of the raised portion 315 in the first direction D1.

For example, one end of the side cover portion 71 in the first direction D1 may be at the same position as one end of the raised portion 315 in the first direction D1, in the first direction D1. Alternatively, one end of the side cover portion 71 in the first direction D1 may be on the other side of the raised portion 315 in the first direction D1 than one end of the raised portion 315 in the first direction D1.

Further, the other end of the side cover portion 71 in the first direction D1 may be at the same position as the other end of the raised portion 315 in the first direction D1, in the first direction D1. Alternatively, the other end of the side cover portion 71 in the first direction D1 may be on one side of the raised portion 315 in the first direction D1 than the other end of the raised portion 315 in the first direction D1.

In this way, the upper portion of the connection portion of the frame portion 314 and the side cover portion 71, located below the raised portion 315, can be protected by the raised portion 315. However, the present disclosure is not limited to this example, and the width of the side cover portion 71 in the first direction D1 does not have to be less than or equal to the width of the raised portion 315 in the first direction D1.

Further, preferably, as shown in FIG. 3, a first width W1 of the side cover portion 71 in a direction perpendicular to both the axial direction and the radial direction, as viewed from the radial direction, is equal to or less than a second width W2 of the tubular portion 313 in that direction. For example, the first width W1 is the width of the side cover portion 71 in the first direction D1. The second width W2 is the width of the tubular portion 313 in the first direction D1. In other words, it is the diameter of the tubular portion 313. In this way, both ends of the side cover portion 71 do not protrude outward from the tubular portion 313 in the above direction, as compared with the configuration in which the first width W1 is wider than the second width W2. Therefore, the radial size of the motor assembly 100 can be made smaller. Further, the possibility that the side cover portion 71 (particularly both ends thereof) hits an external object and receives an impact can be further reduced.

Next, the upper cover portion 72 will be described with reference to FIGS. 1 to 3. The upper cover portion 72 has a covered tubular shape in the present example embodiment, and covers an upper opening Op at the upper end of the upper housing 31. In this way, the upper substrate accommodating chamber Sp2 can be closed with the upper cover portion 72. Therefore, the upper substrate 42 disposed in the upper substrate accommodating chamber Sp2 can be protected by the upper cover portion 72.

In the present example embodiment, the outer edge of the upper cover portion 72 as viewed from the axial direction is in contact with the upper housing 31 via the seal member 722. More specifically, the outer edge of the upper cover portion 72 as viewed from the axial direction comes into contact with the upper end of the peripheral wall portion 316 and the upper end of the upper wall portion 3143 via the seal member 722. As the seal member 722, for example, a silicone-based sealing material or a gasket such as an O-ring or an X-ring can be used. In this way, the upper cover portion 72 can protect the upper substrate 42 accommodated in the upper substrate accommodating chamber Sp2 from water, dust, and the like outside the housing 3.

A protrusion 721 is formed on the outer edge of the upper cover portion 72 as viewed from the axial direction. The protrusion 721 protrudes downward from the outer edge and extends along the outer edge. A part of the protrusion 721 is fitted in the groove Gr formed at the upper end of the upper housing 31.

In the present example embodiment, the protrusion 721 and the groove Gr have a closed curved shape formed throughout the outer edge as viewed from the axial direction. However, the present disclosure is not limited to this example, and the protrusion 721 and the groove Gr do not have to have a closed curved shape as viewed from the radial direction. For example, the protrusion 721 may be formed on a part of the outer edge. Further, the groove Gr may be formed in a part of the upper end of the peripheral wall portion 316 and the upper end of the upper wall portion 3143.

Preferably, the protrusion 721 fits into the groove Gr via the seal member 722. More preferably, the seal member 722 is disposed between the protrusion 721 and the groove Gr throughout the lower end of the upper cover portion 72. In this way, the connection portion between the upper cover portion 72 and the upper end of the peripheral wall portion 316, and the upper wall portion 3143 can be sealed with the seal member 722. Therefore, the ingress of water, dust, and the like at the connection portion can be suppressed more effectively. Therefore, the upper substrate 42 disposed inside the upper substrate accommodating chamber Sp2 and the upper cover portion 72, the electronic component E2 mounted on the upper substrate 42, and the like, can be protected from water, dust, and the like from the outside of the upper housing 31 and the upper cover portion 72.

Note that a recess recessed upward may be arranged on the outer edge of the upper cover portion 72 as viewed from the axial direction, without being limited to the example of the present example embodiment. In that case, on the upper surface of the peripheral wall portion 316 of the housing 3 and the upper surface of the upper wall portion 3143, protrusions that are protruded upward to be fitted into the recesses are provided. That is, it is sufficient that one of the outer edge of the upper cover portion 72 and the housing 3, as viewed from the axial direction, has a second protrusion protruding from one side toward the other. Further, it is sufficient that the other of the outer edge of the upper cover portion 72 and the housing, as viewed from the axial direction, has a second recess that is recessed from one to the other. The second protrusion is fitted into the second recess. Then, preferably, the seal member 722 is disposed between the second protrusion and the second recess. In this way, a labyrinth structure in which the second protrusion is fitted in the second recess can be formed between the outer edge of the upper cover portion 72 and the housing 3 as viewed from the axial direction. Further, the labyrinth structure can be sealed with the seal member 722. Therefore, the waterproof and dustproof properties of the labyrinth structure can be further enhanced.

Alternatively, the above-mentioned second protrusion may not be provided. For example, in FIG. 2, the protrusion 721 may not be provided on the upper cover portion 72 while the groove Gr is provided. In that case, the outer edge of the upper cover portion 72, as viewed from the axial direction, comes into contact with the upper housing 31 via the seal member 722 that is partially accommodated in the groove Gr. Even in this way, the upper cover portion 72 can protect the upper substrate 42 accommodated in the upper substrate accommodating chamber Sp2.

Next, first to fourth modifications of the motor assembly will be described. In the following, configurations different from the configuration in the abovementioned example embodiment will be described. Further, the same components as those in the above-described example embodiment are designated by the same reference signs, and the description thereof may be omitted.

Figure 6:
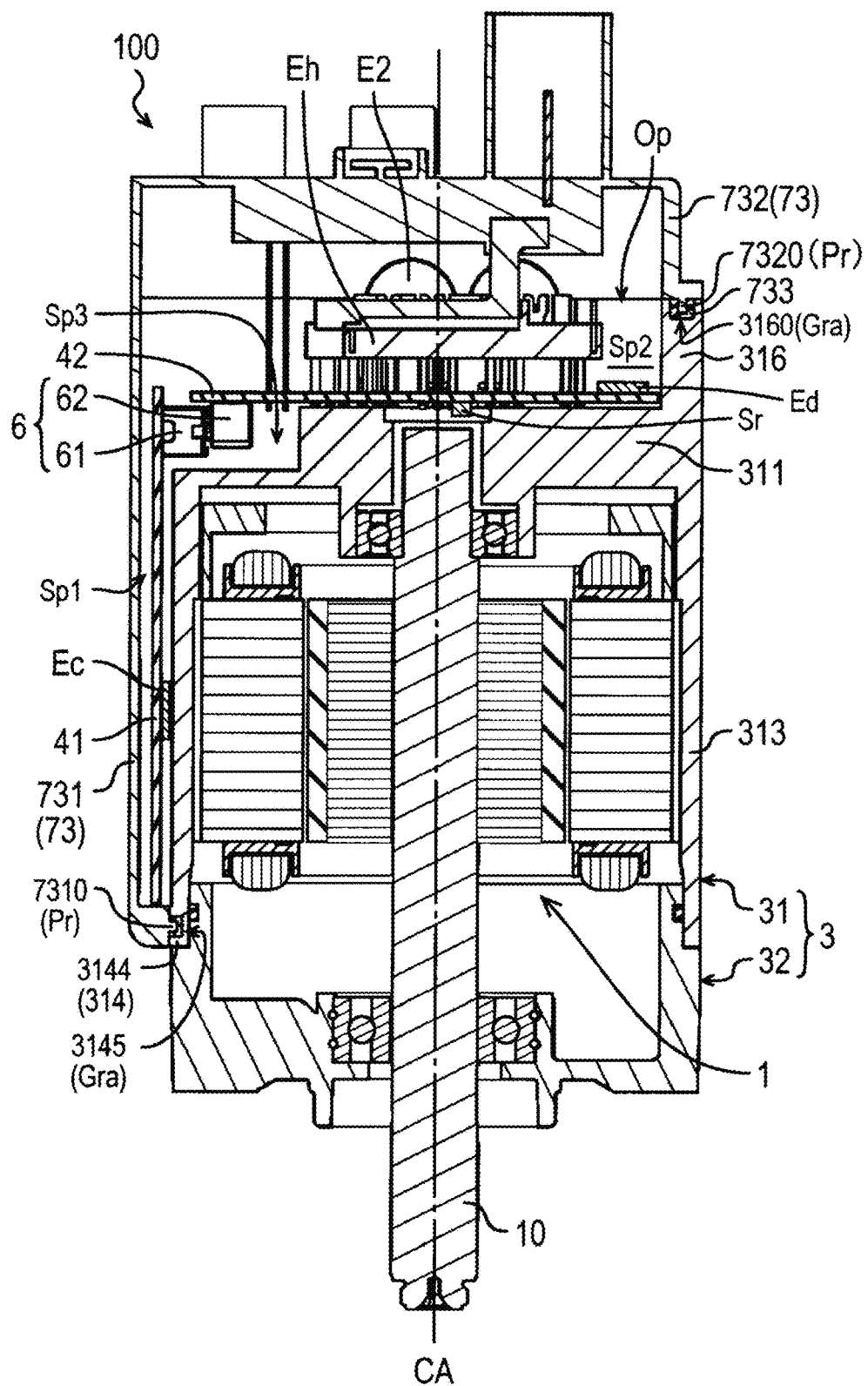
FIG. 6 is a cross-sectional view of a motor assembly according to a first modification according to an example embodiment of the present disclosure as viewed from the radial direction.

FIG. 6 is a cross-sectional view of the motor assembly 100 according to a first modification as viewed from the axial direction. In the first modification, as shown in FIG. 6, the upper wall portion 3143 including the raised portion 315 is not provided to the motor assembly 100. That is, the frame portion 314 has the first side wall portion 3141, the second side wall portion 3142, and the lower wall portion 3144, but does not have the upper wall portion 3143. Therefore, in the upper housing 31, the side substrate accommodating chamber Sp1 is directly connected to the upper substrate accommodating chamber Sp2.

Further, the motor assembly 100 according to the first modification has a cover member 73 instead of the side cover portion 71 and the upper cover portion 72 of the above-described example embodiment. The cover member 73 is attached to the radial outer end and the upper end of the frame portion 314 and the upper end of the peripheral wall portion 316. The cover member 73 covers the radial outer surface of the side substrate 41, the upper surface of the upper substrate 42, the electronic component E2 mounted on the upper substrate 42, and the like.

In this way, by attaching the cover member 73 to the upper housing 31, both the inside of the frame portion 314 and the upper substrate accommodating chamber Sp2 can be closed with the cover member 73. Therefore, the side substrate 41, the upper substrate 42, the electronic component E2 mounted on the upper substrate 42, and the like can be protected by the cover member 73. Further, since the process of individually attaching the members such as the side cover portion 71 and the upper cover portion 72 of the example embodiment can be simplified, the productivity of the motor assembly 100 can be improved.

The cover member 73 has a side cover portion 731 and an upper cover portion 732. The side cover portion 731 has a plate shape extending downward from the radial outer end of the upper cover portion 732, and covers the radial outer surface of the side substrate 41. The side cover portion 731 surrounds the side substrate accommodating chamber Sp1 together with the first side wall portion 3141, the second side wall portion 3142, and the lower wall portion 3144. The upper cover portion 732 has a plate shape extending in the direction perpendicular to the axial direction, and covers the upper opening Op and the upper surface of the upper substrate 42.

The outer edge of the side cover portion 731, as viewed from the radial direction, is in contact with the radial outer end of the frame portion 314. A protrusion 7310 is formed on the outer edge of the side cover portion 731 as viewed from the radial direction. The protrusion 7310 protrudes radially outward from the outer edge and extends along the outer edge.

The outer edge of the upper cover portion 732, as viewed from the axial direction, is in contact with the radial outer end of the peripheral wall portion 316 and the upper end portions of the pair of side wall portions 3141 and 3142 of the frame portion 324. Further, a protrusion 7320 is formed on the outer edge of the upper cover portion 732 as viewed from the axial direction. The protrusion 7320 protrudes downward from the outer edge and extends along the outer edge.

One end of the protrusion 7320 is connected to one end of the protrusion 7310, and the other end of the protrusion 7320 is connected to the other end of the protrusion 7310. In the present example embodiment, the protrusion 7320 and the protrusion 7310 form a closed curved protrusion Pr formed throughout the outer edge of the cover member 73.

On the other hand, in the upper housing 31, the recess 3160 formed at the upper end of the peripheral wall portion 316, the recess formed at the upper ends of the pair of side wall portions 3141 and 3142 (not shown), and the recess 3145 formed at the radial outer ends of the pair of side wall portions 3141 and 3142 and the radial outer end of the lower wall portion 3144 are connected to form a closed curved groove Gra.

The protrusion Pr fits into the groove Gra. Preferably, as shown in FIG. 6, the protrusion Pr fits into the groove Gra via the seal member 733. As the seal member 733, for example, a silicone-based sealing material, or a gasket such as an O-ring or an X-ring can be used. More preferably, the seal member 733 is disposed between the protrusion Pr and the groove Gra throughout the outer edge of the cover member 73. In this way, the connection portion between the cover member 73 and the upper housing 31 can be sealed with the seal member 733. Therefore, it is possible to suppress the ingress of water, dust, and the like at the connection portion.

In addition, the present disclosure is not limited to the example of the present example embodiment, and the groove Gra may be formed on the cover member 73 side and the protrusion Pr may be formed on the upper housing 31 side.

Alternatively, the above-mentioned protrusion Pr may not be provided. For example, in FIG. 6, the groove Gra is provided, while the protrusion Pr does not have to be provided to the upper cover portion 732. In that case, the outer edge of the upper cover portion 732, as viewed from the axial direction, comes into contact with the upper housing 31 via the seal member 733 that is partially housed in the groove Gra. Even in this way, the upper cover portion 732 can protect the upper substrate 42 accommodated in the upper substrate accommodating chamber Sp2.

Figure 7:
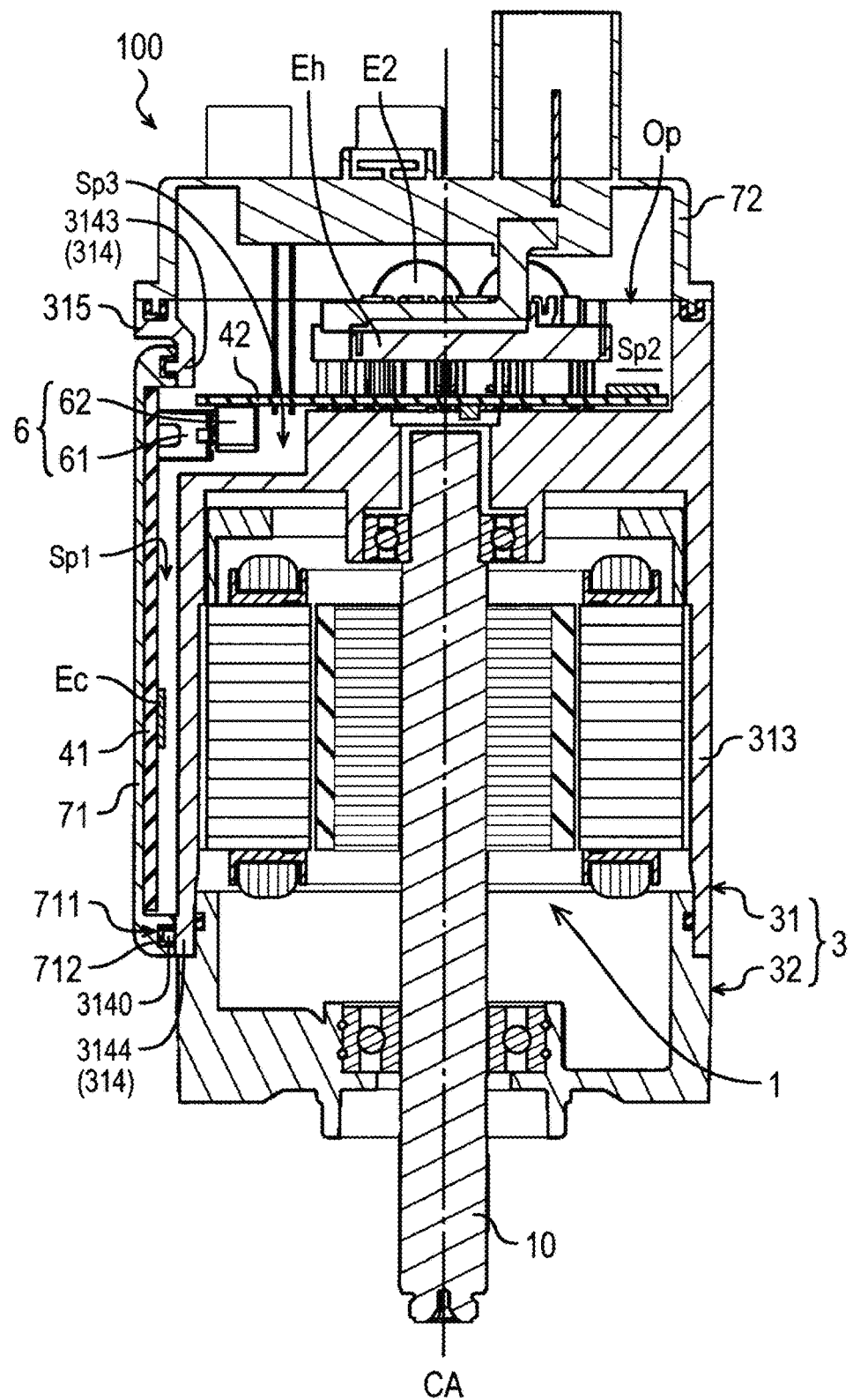
FIG. 7 is a cross-sectional view of a motor assembly according to a second modification according to an example embodiment of the present disclosure as viewed from the radial direction.

Next, a second modification will be described. FIG. 7 is a cross-sectional view of the motor assembly 100 according to a second modification as viewed from the axial direction.

In the second modification, the side substrate 41 is fixed to the radial inner surface of the side cover portion 71 by using an adhesive. However, the fixing structure of the side substrate 41 is not limited to this example. For example, the same means as in FIG. 5A or FIG. 5B may be used.

Figure 8A:
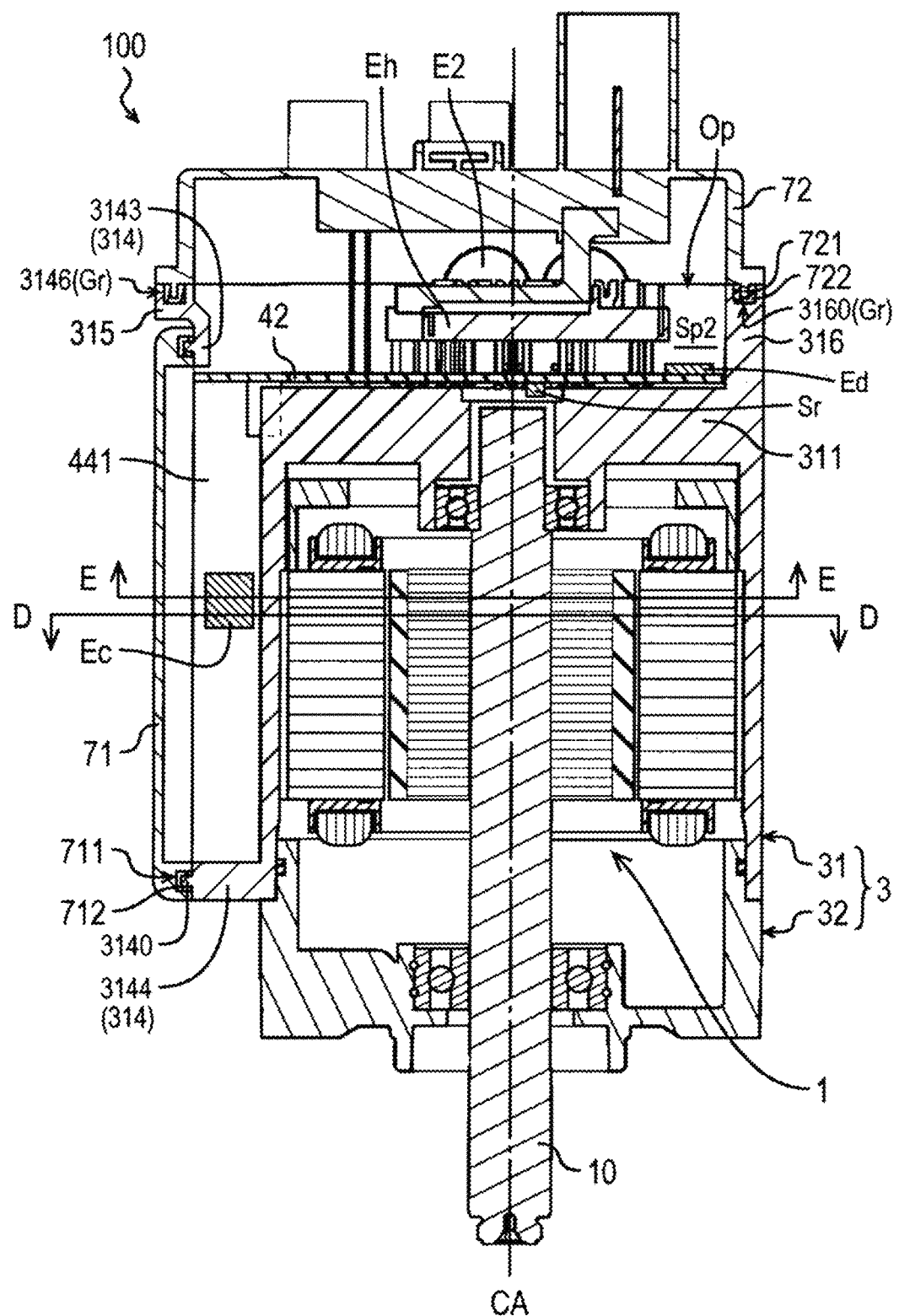
FIG. 8A is a cross-sectional view of a motor assembly according to a third modification according to an example embodiment of the present disclosure as viewed from the radial direction.
Figure 8B:
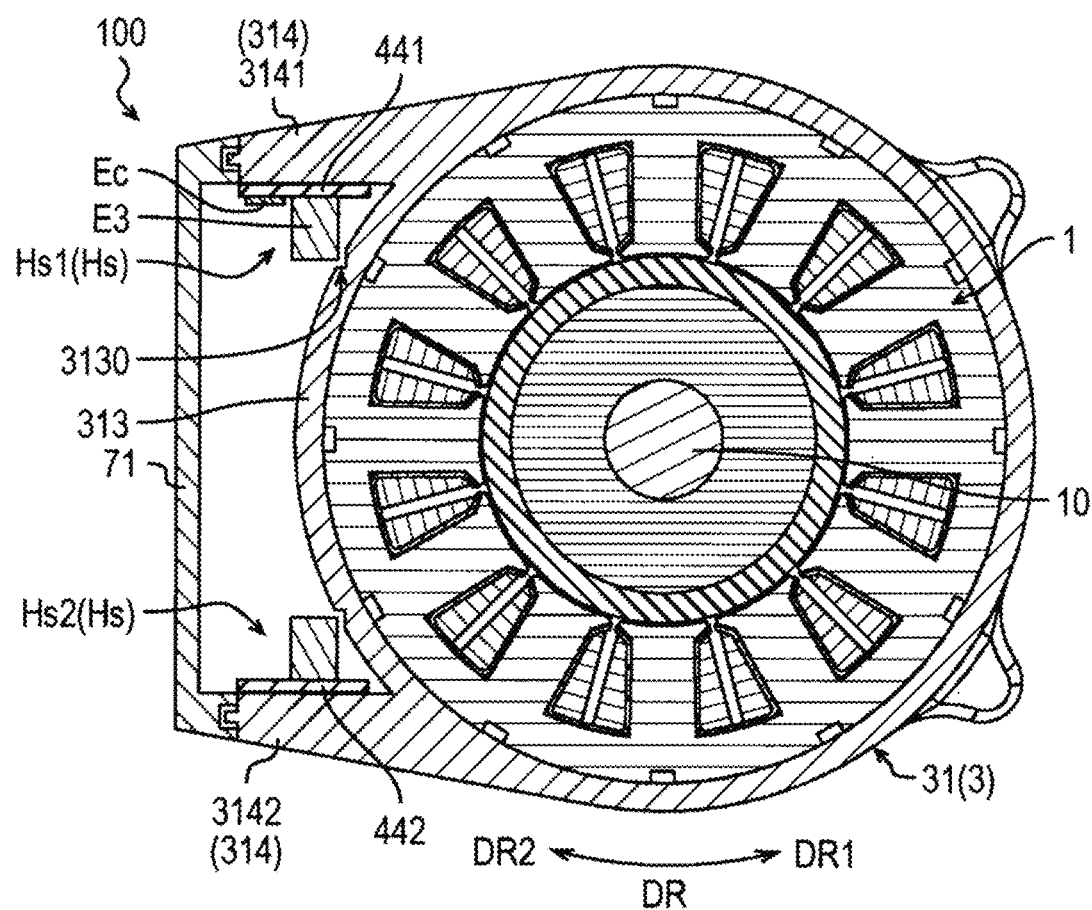
FIG. 8B is a cross-sectional view of the motor assembly according to the third modification as viewed from the axial direction.

Next, a third modification will be described. FIG. 8A is a cross-sectional view of the motor assembly 100 according to a third modification as viewed from the radial direction. FIG. 8B is a cross-sectional view of the motor assembly 100 according to the third modification as viewed from the axial direction. Note that FIG. 8B shows the cross-sectional structure of the motor assembly 100 when the motor assembly 100 is cut along a virtual plane perpendicular to the center axis CA. FIG. 8B corresponds to a cross section taken along a solid line D-D of FIG. 8A as viewed from above to below along the axial direction.

In the third modification, the motor assembly 100 includes substrates 441 and 442 instead of the side substrate 41 of the example embodiment.

The substrates 441 and 442 are provided with the electronic component E3 having a longitudinal direction, and are attached to a pair of side wall portions 3141 and 3142, respectively. The electronic component E3 is, for example, a large-sized electronic component such as a regulator for a control device Ec, a film capacitor, or an electrolytic capacitor, and has a shape having a longitudinal direction. More specifically, the substrate 441 is fixed to the side surface of the first side wall portion 3141 facing the tubular portion 313, and the substrate 442 is fixed to the side surface of the second side wall portion 3142 facing the tubular portion 313. The substrates 441 and 442 and the electronic component E3 are accommodated in the accommodation space Hs between the first side wall portion 3141 and the tubular portion 313. With this configuration, the substrate 441 facing the radial outer surface of the tubular portion 313 can be accommodated in the accommodation space Hs, so that the accommodation space Hs can be used more effectively.

At least the radial inner end of the electronic component E1 is accommodated in the accommodation space Hs. Further, in the vicinity of the electronic component E3, a recess 3130 for preventing contact is disposed on the radial outer surface of the tubular portion 313.

Further, the control device Ec is mounted on the substrate 441. The control device Ec may be mounted on the substrate 442.

The substrates 441 and 442 each are electrically connected to the upper substrate 42 on which the drive circuit Ed is mounted via the connector portion 6.

Further, the recess 3130 is formed in a region of the radial outer surface of the tubular portion 313 that is close to the electronic component E3. The recess 3130 suppresses contact between the electronic component E3 and the radial outer surface of the tubular portion 313.

The motor assembly 100 may have one of the substrate 441 and the substrate 442 in the third modification, not limited to the example of FIG. 8B. A substrate on which the electronic component E3 having a longitudinal direction is mounted may be attached to one of the pair of side wall portions 3141 and 3142.

Further, in FIG. 8A, the motor assembly 100 has the upper substrate 42. However, the present disclosure is not limited to this example, and the motor assembly 100 may not have the upper substrate 42. In that case, the drive circuit Ed is mounted on one of the substrate 441 and the substrate 442. Preferably, the control device Ec is mounted on a substrate, of the substrate 441 and the substrate 442, on which the drive circuit Ed is not mounted.

Figure 9:
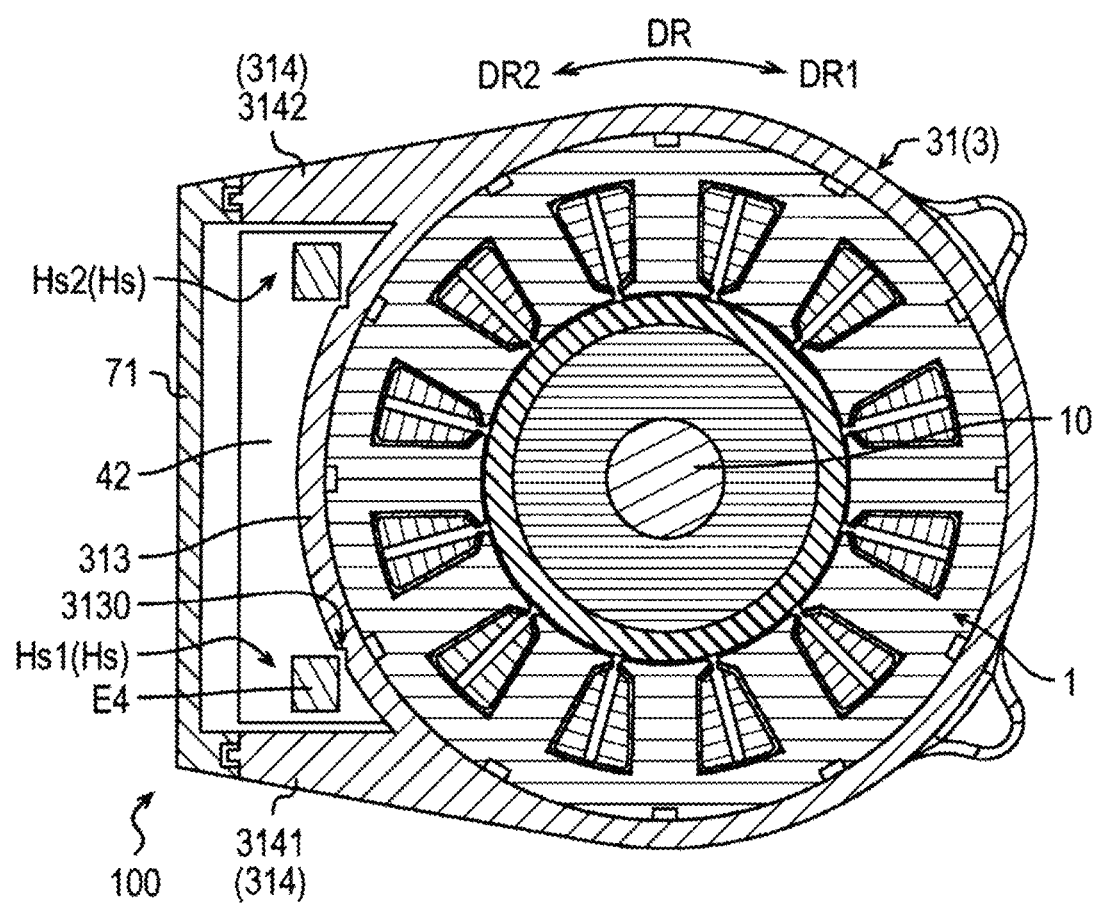
FIG. 9 is a cross-sectional view of a motor assembly according to a fourth modification according to an example embodiment of the present disclosure as viewed from the axial direction.

Next, a fourth modification will be described. FIG. 9 is a cross-sectional view of the motor assembly 100 according to the fourth modification as viewed from the axial direction. Note that FIG. 9 shows the cross-sectional structure of the motor assembly 100 when the motor assembly 100 is cut along a virtual plane perpendicular to the center axis CA. FIG. 9 corresponds to a cross section taken along a solid line E-E of FIG. 8A as viewed from the bottom to the top along the axial direction. In FIG. 9, the axial direction is opposite to that in FIG. 8B. Therefore, it should be noted that, for example, the directions of the one circumferential direction Dr1 and the other circumferential direction Dr2 in FIG. 9 are opposite to those in FIGS. 3 and 8B.

In the fourth modification, while the motor assembly 100 has the upper substrate 42, it does not have the side substrate 41 of the above-described example embodiment and the substrates 441 and 442 of the third modification. The detection unit Sr, the drive circuit Ed, and the control device Ec are mounted on the upper substrate 42. In FIG. 9, these illustrations are omitted.

Further, an electronic component E4 having a longitudinal direction downward is mounted on the lower surface of the upper substrate 42. The electronic component E4 is a large-sized electronic component such as a regulator for a control device Ec, a film capacitor, or an electrolytic capacitor. At least the lower end of the electronic component E4 is accommodated in the accommodation space Hs.

Further, the recess 3130 is formed in a region of the radial outer surface of the tubular portion 313 that is close to the electronic component E4. The recess 3130 suppresses contact between the electronic component E4 and the radial outer surface of the tubular portion 313.

The example embodiment of the present disclosure has been described above. Note that the scope of the present disclosure is not limited to the above-described example embodiment. The present disclosure can be implemented by making various modifications to the above-described example embodiment without departing from the gist of the disclosure. In addition, the matters described in the above example embodiment can be arbitrarily combined together, as appropriate, as long as there is no inconsistency.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly comprising:
a housing which houses a motor with an axis of rotation extends in an axial direction;
a first substrate with a plate shape; and
an electronic component mounted on the first substrate; wherein the housing includes:
  a tubular portion that extends in the axial direction and accommodates the motor; and
  a side wall portion that protrudes from a radial outer surface of the tubular portion in a direction including at least a radial direction and a circumferential direction, and extends in the axial direction;
an accommodation space to accommodate the electronic component is provided between the tubular portion and the side wall portion as viewed from the axial direction;
the tubular portion includes a recess which is opposed to the accommodation space;
the recess is provided on the radial outer surface of the tubular portion and is recessed radially inward;
the electronic component is mounted on a side surface of the first substrate which faces inward in the radial direction; and
the electronic component overlaps the recess when viewed along the radial direction.

2. The motor assembly according to claim 1, wherein
in a portion where a side surface of the side wall portion that opposes the tubular portion at least in the radial direction is connected to the radial outer surface of the tubular portion;
the side surface and the radial outer surface of the tubular portion define an acute angle as viewed from the axial direction.

3. The motor assembly according to claim 1, further comprising:
a second substrate; wherein
one of the first substrate and the second substrate extends in a direction perpendicular to the axial direction; and
another of the first substrate and the second substrate opposes the radial outer surface of the tubular portion.

4. The motor assembly according to claim 3, wherein
a drive circuit of the motor is mounted on one of the first substrate and the second substrate; and
a controller to control the drive circuit is mounted on another of the first substrate and the second substrate.

5. The motor assembly according to claim 1, wherein the first substrate is attached to the side wall portion.

6. The motor assembly according to claim 1, wherein the electronic component includes at least one of a capacitor and a regulator to output a constant voltage.

7. The motor assembly according to claim 1, wherein the electronic component overlaps the recess when viewed along the circumferential direction.

* * * * *